United States Patent [19]

Pick

[11] 4,103,976

[45] Aug. 1, 1978

[54] TWO-PRESSURE BRAKE CONTROL VALVE FOR SINGLE STAGE RELEASING INDIRECTLY ACTING AIRBRAKES

[75] Inventor: Peter Pick, Munich, Fed. Rep. of Germany

[73] Assignee: Knorr-Bremse GmbH, Munich, Fed. Rep. of Germany

[21] Appl. No.: 820,705

[22] Filed: Aug. 1, 1977

[30] Foreign Application Priority Data

Jul. 30, 1976 [DE] Fed. Rep. of Germany ....... 2634320

[51] Int. Cl.$^2$ .............................................. B60I 15/44
[52] U.S. Cl. .......................................... 303/38; 303/44
[58] Field of Search ..................... 303/36–39, 303/43, 44

[56] References Cited

U.S. PATENT DOCUMENTS

| | | | |
|---|---|---|---|
| 2,068,325 | 1/1937 | Hewitt | 303/38 |
| 4,002,375 | 1/1977 | Weber | 303/38 X |
| 4,043,605 | 8/1977 | Hart | 303/37 |

*Primary Examiner*—Duane A. Reger
*Attorney, Agent, or Firm*—Edmund M. Jaskiewicz

[57] ABSTRACT

A two-pressure brake control valve for a single stage releasing indirectly acting airbrake particularly for railway vehicles has a service brake portion in which is a main control element to control a valve so as to subject a brake cylinder to the action of air from an auxiliary air reservoir in response to a decrease in pressure in the brake line per unit time below a predetermined value. An emergency brake portion has a main piston as a main control element and an auxiliary piston is mounted on this main piston. The main piston controls a second valve to further subject the brake cylinder to the action of air from an emergency brake reservoir in response to a decrease in pressure in the brake line per unit time exceeding the predetermined value. A service brake accelerator valve is actuated by the auxiliary piston in response to a variation of pressure in the brake line during a service braking operation when the main piston is in an inactive position.

12 Claims, 1 Drawing Figure

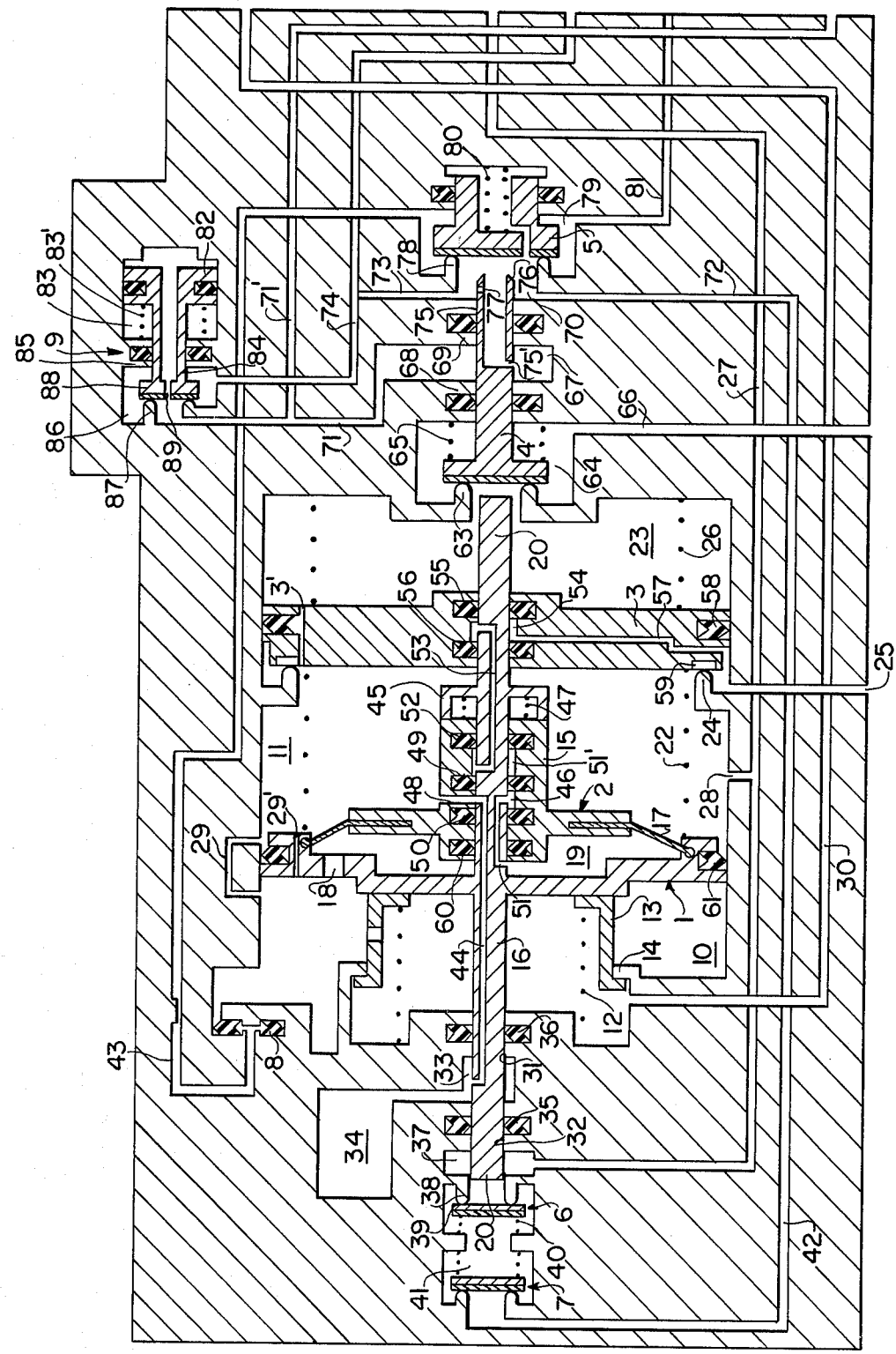

TWO-PRESSURE BRAKE CONTROL VALVE FOR SINGLE STAGE RELEASING INDIRECTLY ACTING AIRBRAKES

The present invention relates to a two-pressure brake control valve for a single stage releasing indirectly acting airbrake for railway vehicles and having service and emergency brake portions, more particularly, to the emergency brake portion having a service brake accelerator.

There has been proposed a two-pressure brake control valve for a single stage releasing indirectly acting airbrake which is particularly adapted for railway vehicles and which has a service brake portion for controlling service braking operations and an emergency brake portion for controlling a rapid braking such as would be desirable under emergency conditions. The service brake portion included a main control element which controls a valve so as to subject at least one brake cylinder to the action of air from an auxiliary air reservoir. This valve is controlled as a function of a pressure decrease per unit time below a predetermined value in the brake line. The emergency brake portion has another main control element which under rapid braking conditions occurring when there is a decrease of pressure per unit time in the brake line exceeding the predetermined value so as to control a valve to additionally subject the brake cylinder to the action of air from an emergency brake reservoir. The brake cylinder is thus subjected to a pressure substantially exceeding the maximum brake cylinder pressure occurring during a service braking operation.

The known two-pressure brake control valves of the type as described above have the disadvantage of the absence of a service brake accelerator which is continuously effective during a service braking operation.

It is therefore the principal object of the present invention to provide a novel and improved two-pressure brake control valve of the type described herein.

It is another object of the present invention to provide such a brake control valve which is capable of controlling a service brake accelerator valve which is in the emergency brake portion of the brake control valve.

It is a further object of the present invention to provide such a brake control valve which has a service brake accelerator which is continuously effective during a service braking operation.

According to one aspect of the present invention there is provided a two-pressure brake control valve for a single stage releasing indirectly acting airbrake, particularly for railway vehicles, which has a service brake portion. A main control element in the service brake portion controls a valve in response to a decrease in pressure in the brake line per unit time below a predetermined value to subject a brake cylinder to the action of air from an auxiliary air reservoir. An emergency brake portion has a main control element therein which controls a second valve in response to a decrease in pressure in the brake line per unit time exceeding the predetermined value to additionally subject the brake cylinder to the action of air from an emergency brake reservoir. The main control element in the emergency brake portion is provided with an auxiliary control element which actuates a service brake acceleration valve in response to variations of pressure in the brake line during a service braking operation when the emergency brake portion main control element is in its inactive position.

Other objects and advantages of the present invention will be apparent upon references to the accompanying description when taken in conjunction with the following drawing, which is exemplary, which is a sectional view through the emergency brake portion of a service control valve according to the present invention showing schematically the structure of the invention.

As may be seen in the drawing, the emergency brake portion includes a main control piston 1 having an auxiliary piston 2 mounted on one side of the main piston. The main control piston 1 further controls two valve seat pistons 3 and 4 together with a valve plate 5 and at the other end controls a valve 6. The emergency brake portion also includes check valves 7 and 8 and a minimum pressure limiting device 9 as known in the art.

The main control piston 1 together with auxiliary piston 2 is slidably displaceable in pressure medium tight relationship within a cylindrical chamber formed in the emergency brake portion such that cylindrical sub-chambers 10 and 11 are formed. In sub-chamber 10 there is a spring 12 which loads the main piston 1 in the direction of valve seat piston 3 by means of a freely positioned sleeve 13 which in its supporting position engages from behind a flange or stop 14 formed on a wall of the housing.

The auxiliary piston 2 is constructed as a diaphragm piston provided with a central slide member 15 which is slidably displaceable along piston rod 16 extending from both sides of the main piston 1. A diaphragm 17 on auxiliary piston 2 has its outer periphery attached on the side of main control piston 1 facing toward the sub-chamber 11. There is an opening 18 in main control piston 1 to provide continuous communication between sub-chamber 10 and a chamber 19 formed between the main and auxiliary pistons.

The valve seat piston 3 has a central opening through which slidably passes an end 20 of piston rod 16 which is the right end of the rod as viewed in the drawing. A spring 22 is positioned between main piston 1 and valve seat piston 3. The valve seat piston 3 is slidably displaceable in a cylindrical chamber 23 and is engageable with a valve seat 24 formed between sub-chamber 11 and chamber 23 to define a valve 3, 24. When valve 3, 24 is closed sub-chamber 11 is shut off from a venting passage 25 formed in a wall of the housing. The chamber 23 is separated under a pressure tight relationship from sub-chamber 11 and venting passage 25 by the valve seat piston 3. A spring 26 in chamber 23 loads the valve seat piston 3 in the direction toward valve seat 24.

A branch passage 28 leads from sub-chamber 11 to a passage 27 which is connected to the brake line. In the illustrated position of main piston 1 which is in contact with sleeve 13, the sub-chambers 10 and 11 communicate to each other through a passage 29 of a predetermined cross section formed in the wall of the housing and also through a throttle passage 29' in main piston 1. Sub-chamber 10 is connected through a passage 30 to an overflow chamber, which is not illustrated, in order to increase the volume of the sub-chamber 10. When valve 3, 24 is closed, sub-chamber 11 and chamber 23 are connected to each other through a throttle passage 3' formed in the plate valve 3.

The piston rod 16 of main piston 1 extends through the sub-chamber 10 and is sealingly guided through two coaxial bores 31 and 32 formed in the housing and a chamber 33 is between these two bores. The chamber 33 is connected to an overflow chamber 34 which is separated by means of packings 35 and 36 from cylindrical chamber 10 on the one hand and on the other hand from a chamber 37 which is connected to the brake line passage 27. The left end of piston rod 16 designated as 20′ terminates in the chamber 37 within which is formed a valve seat 38 that can be closed by a plate valve member 39 loaded by a spring 40 in a chamber 41 that is connected through the check valve 7 to a passage 42. The passage 42 communicates with the brake cylinder and an auxiliary air reservoir neither of which are shown in the drawing.

The sub-chamber 10 is connected through the check valve 8 to a passage 43 which communicates with the emergency brake reservoir which similarly is not shown in the drawing. The piston rod 16 has therein a longitudinally extending bore 44 which has one end opening into chamber 33 on a side of the main piston 1 and on the other side of the main piston the bore opens in the range of displacement of the slide member 15 of auxiliary piston 2.

The auxiliary piston 2 including its slide member 15 is capable of assuming two positions with respect to the main piston 1. The auxiliary piston 2 is illustrated in its advanced position wherein slide member 15 contacts a stop 45 formed on piston rod 16 against the force of a spring 47.

Slide member 15 has an inner annular groove 46 which is connected to an outlet of piston rod passage 44 when the auxiliary piston 2, 15 is in the illustrated advanced position. The slide member 15 also has a radially extending passage 48 which connects annular groove 46 to sub-chamber 11. The annular groove 46 is located between packings 49 and 50 in the slide member 15 which packings are in tight sealing relationship with piston rod 16.

Piston rod 16 has a further passage 51 which extends from the annular groove 46 to open into chamber 19. In the illustrated advanced position of auxiliary piston 2, 15, the annular groove 46 is connected both to sub-chamber 11 and the chamber 19 so that in this position of the auxiliary piston both these chambers are connected through passage 44 to chamber 33 and to the overflow chamber 34.

The slide member 15 has a further annular groove 51′ which is separated by the packing 49 from annular groove 46. The annular groove 51′ is closed by a packing 52 from the exterior of the auxiliary piston. A passage 53 in piston rod 16 extends from the annular groove 51′ to an annular groove 54 formed in valve seat piston 3 and located between packings 55 and 56 to seal against the surface of piston rod 16. A passage 57 extends from the annular groove 54 radially through valve plate 3 to open on the periphery of the valve plate between a piston packing 58 and an abutment surface 59 which is engageable with the valve seat 24. Thus, the annular groove 54 in valve seat piston 3 is connected to the venting passage 25 when valve 3, 24 is closed and main piston is in its illustrated position.

The slide member 15 of the auxiliary piston is capable of assuming a second position which is a retracted normal position in contact with the main piston 1. In the retracted normal position of slide member 15, a packing 60 in the slide member moves over the outlet of passage 51 to the chamber 19. This outlet is then positioned between packings 50 and 60 of the slide member so as to be closed off in pressure-tight relationship from the chamber 19. In addition, the packing 49 in slide member 15 slides over the other outlet of passage 51 as well as over the corresponding outlet of passage 44. Thus, passages 44 and 53 are both connected to the annular groove 51′ in slide member 15 as result of which, with main piston 1 in its illustrated position and valve 3, 24 closed, the overflow chamber 34 is connected to the venting passage 25 to the atmosphere through piston rod passage 53, annular groove 53 in valve seat piston 3 and passage 57 in the piston 3.

Thus, dependent upon the position of the auxiliary piston unit 2, 15, overflow chamber 34 and chamber 19 are thus connected to sub-chamber 11 or to the atmosphere when main piston 1 abuts sleeve 13 supported by spring 12 and when the valve 3, 24 is closed. In the above described and illustrated normal position of main piston 1 and valve seat piston 3, the auxiliary piston 2 controls the pressurization of the overflow chamber 34 with air from sub-chamber 11 or the venting of this overflow chamber to the atmosphere.

In the illustrated normal position of main piston 1, sub-chambers 10 and 11 communicate with each other through throttle passage 29. When main piston 1 together with auxiliary piston 2 is displaced to the left under the action of pressure in sub-chamber 11 against the force of spring 12, packing 61 on the periphery of main piston 1 will slide over the outlet of throttle passage 29 into sub-chamber 10 so that communication between sub-chambers 10 and 11 through the passage 29 is blocked. Further, left end 20′ of the piston rod 16 will push valve plate 39 against the force of spring 40 from its valve seat 38 so that chamber 37 connected to passage 27 is connected to the chamber 41 located between valve 6 and 7.

When main piston 1 together with auxiliary piston 2 is displaced to the right by pressure in sub-chamber 10 against the force of spring 22, the piston packing 61 will slide over the opening of throttle passage 29 into sub-chamber 11 to again block communication between sub-chambers 10 and 11. In addition, stop 45 will abut against valve seat piston 3 to separate the piston 3 from valve seat 24 against the force of spring 26. Sub-chamber 11 is thus connected to the atmosphere through vent passage 25.

Cylindrical chamber 23 is connected through a valve seat 63 to a valve chamber 64 in which is located the valve seat piston 4 which is urged by a spring 65 against valve seat 63 so as to block communication between chamber 23 and valve chamber 64 which is connected to a venting passage 66.

The valve piston 4 traverses a chamber 67 which is separated on one hand by a housing wall 68 from the valve chamber 64 and on the other hand by a housing wall 69 from a valve chamber 70. The valve seat piston 4 terminates in valve chamber 70. The walls 68 and 69 are provided with annular recesses in which are located packings for pressure-tight and sliding engagement of the valve seat piston 4.

The chamber 67 is connected through passage 71 to the minimum pressure limiting device 9. The chamber 70 is connected through a passage 72 to check valve 7 and through a branch passage 73 to a passage 74 which connects the pressure limiting device 9 to the auxiliary air reservoir through a valve in the service brake portion which is not illustrated in the drawing. From passage 71 there is a branch passage 71′ which is connected to the brake cylinder.

The forward or right hand end of valve seat piston 4 comprises a tubular portion 75 having a radial opening 75' to communicate chamber 67 to valve chamber 70. The forward end of tubular portion 75 defines a valve seat 76 and there is a lateral throttle opening 77 in the tubular portion 75 to additionally connect valve chamber 70 to chamber 67. A valve seat 78 connects valve chamber 70 to a chamber 79 in which is located valve plate 5 loaded by spring 80 against valve seat 78. The valve plate 5 thus defines a valve 5, 76 with valve seat 76 and a valve 5, 78 with valve seat 78. When valve 5, 78 is closed, valve chamber 70 is shut off from chamber 79 which is connected to passage 43 leading to the check valve 8. In addition, chamber 79 is connected through a passage 81 to the emergency brake reservoir which is not illustrated.

The minimum pressure limiting device 9 is known in the art and includes a piston 82 slidably and sealingly displaceable within a cylindrical chamber 83. The piston 82 is mounted on a piston tube 84 which is open at both ends and is slidably and sealingly displaceable through an opening in a wall 85 to terminate in a valve chamber 86 which is connected to the passage 74. The valve chamber 86 is also connected through a valve seat 87 to the passage 71. On the left hand end of the piston tube 84 there is a plate valve member 88 having a throttle bore 89 therethrough to provide communication to the interior of the piston tube and the surface of the piston away from the valve plate 88. The valve seat 87 and valve plate 88 thus form a valve 87, 88 which blocks passages 71, and 71' from the passage 74 when in its closed position. A spring 83' loads the piston 82 in a direction to open the valve 87, 88.

When main piston 1 together with auxiliary piston 2 is shifted to the right as viewed in the drawing, not only is the valve seat piston 3 opened but the right end 20 of piston rod 16 lifts valve seat piston 4 from its seat 63 against the force of spring 65 and the valve seat piston 4 which is then shifted to the right lifts valve plate 5 from its valve seat 78 against the force of spring 80. The opened forward end 76 of valve seat piston 4 is thus closed but chamber 67 remains connected to valve chamber 70 through opening 75', tubular portion 75 and the throttle opening 77.

OPERATION OF THE EMERGENCY BRAKE PORTION

As known in the art, there is a distinction between normal service braking operation and rapid braking. During a service braking action, the pressure in the brake line is decreased either in increments or continuously. During this reduction, the pressure in the brake line may be reduced to such an extent that a full braking effect is attained. The service braking operation is controlled by the service brake portion which is not shown in the drawing and which forms a two-pressure control valve together with the emergency brake portion disclosed as the present invention. The service brake portion may be of the type as disclosed in applicant's copending application Ser. No. 769,334 filed May 13, 1977, now U.S. Pat. No. 4,063,784, of the type shown in the FE-brake control valve of Knorr-Bremse, assignee of the present application, or in the ABD-control valve.

Rapid braking is employed in extraordinary situations, particularly in emergencies when a quick stopping action is desired, and is controlled by the emergency brake portion of the brake control valve. The pressure introduced into the brake cylinder during a rapid braking operation is 15–20% greater than during a full service braking operation. In addition, upon release of the brakes after a rapid braking operation the brake line is refilled at an accelerated rate.

INITIAL FILLING OPERATION TO PLACE THE VEHICLE IN OPERATION

Compressed air is supplied to sub-chamber 11 and chamber 37 through the passage 27 which is connected to the brake line. Main piston 1 together with auxiliary piston 2 will be shifted to the left as viewed in the drawing against the force of spring 12. This leftward movement of main piston 1 will cause check valve 6 to be opened by end 20' of piston rod 16. This opening action will enable compressed air to be supplied to the chamber 41. The check valve 7 however remains closed so that compressed air cannot pass through passage 72 into the brake cylinder. Sub-chamber 10 is filled with compressed air from the brake line through throttle opening 29' in main piston 1 and cylindrical chamber 23 is filled with the same compressed air through 3'. A low by-pass filling of the emergency brake cylinder which is connected to passages 43 and 81 is achieved from sub-chamber 10 through check valve 8. The remaining components actuated to attain the initial filling to place the vehicle in operation are controlled by the service brake portion which is not shown.

When the pressure in sub-chamber 10 increased to such a value that a predetermined pressure difference is established between the sub-chambers 10 and 11, spring 12 will become effective and will shift the main piston 1 to the right into its illustrated position until sleeve 13 is stopped by the abutment 14. During this displacement of piston 1, check valve 6 will be closed and main piston 1 will reach its normal position and is stabilized in this position by the spring 22. Throttle passage 29 and the constricted opening 29' determine the sensitivity of the emergency brake portion.

Without being subjected to any pressure, the auxiliary piston 2 will contact main piston 1 under the action of spring 42 acting against slide member 15 so it can be said that the auxiliary piston assumes its normal position under a pressureless condition.

During the initial filling operation auxiliary piston 2 remains in its normal position contacting main piston 1 under the effect of the pressure in sub-chamber 11 which initially is greater than the pressure in sub-chamber 10. However, auxiliary piston 2 is retained in its normal position on main piston 1 under the force of spring 47 even when the pressure is equalized in sub-chambers 10 and 11 and main piston 1 is in its normal position. During this stage, overflow chamber 34 is connected through passage 44 in piston rod 16, annular groove 51' in slide member 15, passage 53 in piston rod 16, annular groove 54 and passage 57 in valve seat piston 3 to the atmosphere through vent passage 25.

SERVICE BRAKING ACTION AND RELEASE

During a service braking operation, the pressure in the brake line is lowered in increments or continuously. The brake line pressure may be reduced to such an extent that full braking is obtained. During service braking, the decrease of pressure per unit time in the brake line and thus in sub-chamber 11 is so small that the pressures in sub-chambers 10 and 11 can be equalized through throttle passage 29 and main piston 1 will not move from its illustrated normal position to the right against spring 22.

Thus, while main piston 1 remains in its normal position during a service braking operation, auxiliary piston 2 is reciprocated as a function of the pressure variation in the brake line. Auxiliary piston 2 will thus control the pressurization and venting of overflow chamber 34 so that auxiliary piston 2 associated with overflow chamber 34 and the passages in the piston rod has the function of a service brake accelerator which is constantly effective, i.e., during every stage of the service braking operation. Thus, the main piston of the emergency brake portion is provided with a control element for service brake acceleration and this element is continuously effective during service braking.

When the pressure in the brake is lowered to predetermined magnitude for a particular braking stage during a service braking operation, the service brake portion, which is not shown, will introduce a pressure from the auxiliary air reservoir into the brake cylinder corresponding to this decrease of pressure. The control of this pressure is carried out in a known manner by means of a main control element in the service brake portion which on one hand is subjected to the action of pressure in the auxiliary air reservoir and on the other hand to the action of pressure in the brake line. As known in the art, such a main element in the service brake portion will react quickly when a brake accelerator is effective upon a decrease of pressure in the brake line since the accelerator will quickly draw off air from the brake line on the side of the main control element into an overflow chamber. In this manner it is possible to accelerate substantially the switching or actuation of the main element in the service brake portion.

According to the present invention this function of the service brake accelerator is carried out by the auxiliary piston 2 in the emergency brake portion which otherwise is inoperative during service braking.

During service braking, when the pressure in the brake line and thus the pressure in sub-chamber 11 is lowered to a certain extent, auxiliary piston 2 will be shifted to the right into its position as illustrated as result of the higher pressure in sub-chamber 10. This pressure also exists in the chamber 19 because of the opening 18 in main piston 1. The overflow chamber 34 is disconnected from a vent passage to the atmosphere in this illustrated position and, instead, sub-chamber 11 is connected to the overflow chamber 34 through passage 48 in slide member 15 of the auxiliary piston 2 and passage 44 in the piston rod 16.

The pressure in sub-chamber 11 and thus also the pressure in the corresponding cylindrical chamber on a side of the main element in the service brake portion is thus further lowered as result of which switching of the main element is carried out with greater speed in the sense of a service brake acceleration. However, such additional decrease of pressure in the brake line effected by drawing off air into the overflow chamber 34 produces a lower value than the lowering of pressure introduced during rapid braking so that main piston 1 remains in its normal position.

When the brake is released after a service braking operation, the pressure in sub-chamber 11 is again increased which causes auxiliary piston 2 to immediately return into its normal position wherein overflow chamber 34 is again vented so as to be again available for lowering the pressure during another service braking operation.

During a rapid or emergency braking operation the lowering of pressure in the brake line and thus also in the sub-chamber 11 is so great that main piston 1 is shifted to the right against the force of spring 22. Auxiliary piston 2 had already been shifted against the force of spring 47 into its right hand end position so that the air from sub-chamber 11 flows off into the overflow chamber 34 as result of which the displacement of the main piston 1 to the right is further accelerated.

As main piston 1 is being displaced to the right the piston will slide over the throttle passage 29 opening in sub-chamber 11 and will push open valve 3, 24 so that sub-chamber 11 is suddenly vented to the atmosphere through the relatively large cross sectional area of the opening of valve seat 24. In addition, piston rod 16 opens valve 4, 63. The valve seat piston 4 being displaced to the right against the force of spring 65 contacts valve plate 5 with its forward valve seat 76 to close valve 5, 76. At substantially the same time, valve plate 5 is separated from its valve seat 78 against the force of spring 80 so that valve 5, 78 is opened and air flows from passage 81 connected to the emergency reservoir through constriction 77, tubular portion 75 of valve seat piston 4, chamber 67 and passages 71 and 71' to the brake cylinder. The main element in the service brake portion simultaneously releases air from the auxiliary air reservoir into passage 74 from which the air flows to the brake cylinder through passage 73, chamber 70 and constricted opening 77 as described above. In parallel therewith, air also flows from passage 74 through the pressure limiting device 9 which is held open by spring 83' and through passages 71 and 71' into the brake cylinder.

At a brake cylinder pressure of approximately 15 psi., the pressure limiting device 9 shifts into the closed position and any further pressure increase in the brake cylinder is determined solely by the constriction 77. Since the brake cylinder is supplied simultaneously by the auxiliary and emergency reservoirs, pressure equalization will produce a 15–20% higher brake cylinder pressure than in the case of a full service braking operation. After a predetermined time, such as for example 70 seconds, the pressure in sub-chamber 10 is reduced through constriction 29' to such an extent that the springs 80, 65, 22 and 12 will begin to shift main piston 1 together with auxiliary piston 2 in a direction toward the left back into its normal position. During this shifting displacement, valves 3, 24 and 5, 76 as well as 4, 63 are again closed so that only spring 22 still functions to shift main piston 1 back into its normal position. When main piston 1 reaches its normal position, the open end of throttle passage 29 located in sub-chamber 11 is again released. Spring 47 then presses auxiliary piston 2 back into its normal position against main piston 1 wherein overflow chamber 34 is connected to the atmosphere.

RELEASE AFTER EMERGENCY BRAKING

During a disengagement or release of the brakes after a rapid or emergency braking operation, the emergency brake portion will control an accelerated refilling of the brake line with air from the auxiliary air reservoir and the brake cylinder. Main piston 1 will be shifted to the left as seen in the drawing by air flowing into sub-chamber 11. During this shifting, the piston rod 16 will open valve 6 to enable air to escape from chamber 41 located between valve 6 and 7 so that the pressure from the brake cylinder acting on check valve 7 is sufficient to open this valve 7.

Through the now opened check valve 7 and check valve 6 which is held open by piston rod 16, air will flow through passage 42 from the brake cylinder and auxiliary air reservoir into chamber 37 and into passage 27 which leads to the brake line. This connection is interrupted by closing of the check valve 7 when the pressures in the brake cylinder and auxiliary air reservoir drop to a particular predetermined value. Upon a further increase in brake line pressure, check valve 7 will thus prevent air from flowing to the brake cylinder.

During release, sub-chamber 10 is filled through the constricted opening 29' and cylindrical chamber 23 is refilled through constricted opening 3'.

Thus it can be seen that the main control piston of the emergency brake portion is provided with a control element for service brake acceleration and this control element is continuously effective during all stages of a service braking operation. The control element comprises the auxiliary piston 2 which performs the function of the service brake accelerator and during this functioning the remaining components of the emergency brake portion are inactive during a service braking operation.

It will be understood that this invention is susceptible to modification in order to adapt it to different usages and conditions, and accordingly, it is desired to comprehend such modifications within this invention as may fall within the scope of the appended claims.

What is claimed is:

1. In a two-pressure brake control valve for a single stage releasing indirectly acting air brake for railway vehicles having a valve controlled by a main control element of a service brake portion in response to a decrease in pressure in the brake line per unit time below a predetermined value to subject a brake cylinder to the action of air from an auxiliary air reservoir, an emergency brake portion having a second main control element having an inactive position, means responsive to a decrease in pressure in the brake line per unit time exceeding the predetermined value for controlling a second valve by said second main control element to further subject the brake cylinder to the action of air from an emergency brake reservoir, an auxiliary control element on said second main control element, and a service brake acceleration valve in said emergency brake portion actuated by said auxiliary control element in response to variation of pressure in the brake line during a service braking operation when said second main control element is in an inactive position.

2. In a two-pressure brake control valve as claimed in claim 1 wherein said second main control element comprises a main piston having spaced stop means thereon, said auxiliary control element comprising an auxiliary piston mounted on a side of said main piston and displaceable between said spaced stop means.

3. In a two-pressure brake control valve as claimed in claim 2 wherein said auxiliary piston comprises a diaphragm having an outer periphery attached in pressure medium tight relationship on said side of the main piston.

4. In a two-pressure brake control valve as claimed in claim 2 and a central piston rod extending from said main piston, said auxiliary piston having a central opening slidably and sealingly receiving said piston rod therethrough.

5. In a two-pressure brake control valve as claimed in claim 4 wherein said auxiliary piston comprises a valve member slidable on said piston rod to define a service brake valve.

6. In a two-pressure brake control valve as claimed in claim 2 and means for defining a first sub-chamber on the side of said main piston away from said auxiliary piston, said main and auxiliary pistons defining a chamber therebetween, said main piston having a passage therethrough to communicate with said first sub-chamber and said chamber.

7. In a two-pressure brake control valve as claimed in claim 4 wherein said emergency brake portion has a cylindrical chamber therein, said main piston being displaceable within and dividing said cylindrical chamber into said first sub-chamber and a second sub-chamber when said main piston is in a normal position during service braking conditions, said second sub-chamber being connected to a brake line, means for defining a throttle connection between said first and second sub-chambers, said spaced stops being on said piston rod and said auxiliary piston being displaceable in said second sub-chamber between said spaced stops.

8. In a two-pressure brake control valve as claimed in claim 7 wherein said stops define first and second positions of said auxiliary piston, there being an overflow chamber in said emergency brake portion, and means including a portion of said piston rod for connecting said overflow chamber to the atmosphere when said auxiliary piston is in its first position and for shutting the connection to the atmosphere to connect said overflow chamber to said second sub-chamber when said auxiliary piston is in its second position.

9. In a two-pressure brake control valve as claimed in claim 8 wherein said auxiliary piston comprises a valve member slidable on said piston rod, said valve member having first and second spaced annular chambers surrounding said piston rod, a first passage within said piston rod opening to said overflow chamber and to a second passage within said piston rod opening to the atmosphere, said second annular chamber connecting said first and second passages to connect said overflow chamber to the atmosphere in the first position of said auxiliary piston and said first annular chamber connecting said first passage through a third passage in the auxiliary piston to said second sub-chamber when the auxiliary piston is in its second position.

10. In a two-pressure brake control valve as claimed in claim 9 and a valve seat piston slidably and sealingly displaceable on said piston rod and engageable with a valve seat in a closed position to close said second sub-chamber from the atmosphere, means on said piston rod engageable with said valve seat piston during an emergency braking operation to lift said valve piston from said valve seat to an opened position, there being fourth passage means in said piston rod, said valve seat piston having fifth passage means connecting said fourth passage means to the atmosphere when said valve seat piston is in the closed position.

11. In a two-pressure brake control valve as claimed in claim 9 and spring means between said auxiliary piston and one of said stops on said piston rod for limiting the auxiliary piston in its first position wherein said overflow chamber is connected to the atmosphere.

12. In a two-pressure brake control valve as claimed in claim 9 wherein there is a sixth passage means in said piston rod communicating with the chamber between said main and auxiliary pistons and said first annular chamber through said third passage to said second sub-chamber when said auxiliary piston is in its second position.

* * * * *